June 5, 1934.   H. F. ECKHARDT   1,961,745
LAMINATED MATERIAL
Filed Jan. 16, 1931
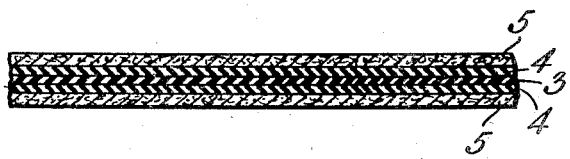
INVENTOR
HARRY F. ECKHARDT
BY
ATTORNEY Patented June 5, 1934

1,961,745

UNITED STATES PATENT OFFICE 1,961,745

LAMINATED MATERIAL

Harry F. Eckhardt, Cleveland, Ohio, assignor to The Mechanical Rubber Company, New York, N. Y., a corporation of New Jersey Application January 16, 1931, Serial No. 509,048

2 Claims. (Cl. 154—54)

This invention relates to the art of shims, washers, mountings, and similar devices which are designed to absorb, refract, and in various ways deaden and dissipate mechanical vibrations such as engine vibrations or sounds caused by the operation of moving parts. The invention is also related to the art of preventing squeaks and rattles between moving metallic parts or between connected metallic parts, one of which is closely associated with mechanical vibration or dynamic movement.

In the automotive industry which is typical of the arts to which the invention is adapted, it has been sought to provide deadening elements between various connected parts such as an engine and chassis, body and chassis, and various parts thereof which are connected together, but which are subject to loosening by vibration and constant varying stresses and strains. The engine vibrations have always tended to be transmitted to the body of an automobile thereby causing undesirable conditions for the well-being of the cargo or for the comfort of the passengers. Moreover, the constant stresses and strains placed upon various connected parts of the body have, as indicated above, loosened appreciably the means of connection, which means have continually needed tightening in order to prevent undesirable rattles and squeaks.

In order to overcome these difficulties, various types of materials have been used as deadening, shock absorbing or supporting media, among which are leather, tar paper, fibre board, treated fabrics and molded rubber. These materials have been to some extent satisfactory but have been far from entirely satisfactory. For instance they have all been subject to "creeping", that is, continual stresses between metallic elements between which such materials are interposed, have resulted in a squashing out of the vibration deadening or supporting material. This causes a loosening of the connected structure, resulting in undesirable rattles and in squeaks caused by relative movement of the metallic elements and the supporting elements. Further the supporting or vibration deadening material has in many cases been susceptible to being soaked or moistened with water, which has softened the same and thus contributed to the loosening of the entire structure. As above indicated, rubber material has been used to overcome this latter difficulty, but this material, molded rubber in this instance, has quickly crept and been squashed by pressure, until it has lost its original thickness and ability to form a tight intermediary between connected elements, and when wet has given rise to squeaking when the loosened parts have moved relative thereto.

An object of this invention is to overcome the above mentioned difficulties and to provide a material of the nature described which is firmer than molded rubber but which is resilient enough to absorb vibration, which is waterproof and which when wet does not squash out or creep or effect a loosening between connected elements to give opportunity for rattles and squeaks.

The new material is constructed by laminating various types of rubber-fiber compositions with rubber containing materials, in order that vibration transmitted to one surface of the laminated sheet may be absorbed, refracted or otherwise dissipated so that a minimum amount of vibration is transmitted through the same to the connected element or body which is sought to be protected. The rubber-fiber compositions are preferably situated on the outer or wear surfaces of the laminated product and are adhesively secured to the other materials in such a manner that such latter materials cannot creep, loosen, or squash out or otherwise destroy the efficiency of the product. The entire structure is thoroughly waterproof and is not susceptible to absorption of water to an appreciable degree.

In the drawing:

Fig. 1 is a sectional or elevational view of one form of material which incorporates the novel features of this invention.

Fig. 2 is a similar view of a modification thereof.

1 is a densely compacted fibrous material, the fibres of which are intimately associated with rubber and which may be obtained by means of the process set out in the patent to Rose & Owen, No. 1,843,581, dated Feb. 2, 1932, wherein there is obtained a fibre rubber material comprising a closely matted mass of fibres firmly bonded by small substantially discontinuous particles deposited from an aqueous dispersion of rubber either alone or compounded, the material being characterized by its density, toughness, high tensile and compressive strength, high flexing test, resistance to water and to abrasion. The fibres are distributed continuously throughout the body of the material and are bonded by minute rubber particles uniformly distributed throughout to form a sheet of the above mentioned characteristics. This material may have any desired amount of rubber incorporated therein but is preferably one in which from 12–50% of rubber is deposited on the fibres from an aqueous dispersion of rubber. Its density should be approximately 1.3 and compressive strength should be at least 1300 lbs. per sq. in. It can be seen that the associated fibre and rubber material 1 is a dense, firmly compacted, waterproof, material which is capable of withstanding large loads without distortion or creeping but which possesses a certain amount of resiliency by virtue of the rubber component incorporated therein. Interposed between sheets 1 is a relatively soft vulcanized rubber composition of sufficient compressive strength to withstand the weight which it is designed to support, without substantial distortion. Due to the fact that the two rubber-containing materials are of different physical properties and react differently to the transmission of vibration, it is apparent that vibrations transmitted to one of the outer surfaces will be some extent be absorbed by it, yet those vibrations which pass through this medium will be largely dissipated by the intermediate rubber composition. The remaining vibrations transmitted through these two media are further lessened by the adjoining rubber-fibre sheet so that the ultimate intensity of vibration will be effectively diminished.

Fig. 2 is illustrative of another form of product which may be constructed in accordance with the principles of this invention. In this instance a hard rubber sheet 3 is provided between two soft rubber sheets 4, on the outer sides of which are provided compositions 5 of fibre associated with rubber. In this instance there are three rubber containing materials of different physical properties which exert a more efficient dissipation of transmitted vibration.

The various plies may be laminated together in various ways, for instance a film of rubber cement may be applied to two faces of the composition 1 and soft rubber sheet 2 may be inserted therebetween and the whole subjected to a suitable pressure, say 1000 lbs. per sq. in. for a determined interval, say 5 min., after which the completed sheet may be placed in piles and stored for an interval sufficient to allow complete drying of the adhesive. If desired, thin films of vulcanizable material may be spread on the surfaces to be adhered together and the laminated whole may be put into a vulcanizing press for an interval sufficient to vulcanize the various materials together. In this case, however, the rubber composition 2 should be substantially unvulcanized or incompletely vulcanized when initially inserted.

The sheet material is cut into sizes and shapes suitable for the specific purpose to which it is to be put, i. e. engine mountings, body shims, shock absorbing gaskets, spacers or shock insulators. The size or width of the laminations may be varied to suit requirements.

It can be seen that the new product, in addition to its sound and vibration deadening characteristics, possesses the ability to stand up under considerable pressure and, being waterproof, will not soften when exposed to wet conditions. The inner rubber layer is adhesively secured to the outer plies and thus prevented from creeping as it is thus rigidly held in place. Owing to the fact that there can be no creeping or softening of material, it can be easily seen that when once inserted between two adjoining members and tightly connected therebetween, there can be no loosening of the structure and no resulting rattling or squeaking.

Having thus described my invention, what I claim and desire to protect by Letters Patent is:

1. A laminated composition for resisting the transmission of vibration comprising alternate layers of rubber-containing materials, the outer layers being composed of densely compacted fibres intimately associated with rubber particles deposited thereon from an aqueous dispersion of rubber, intermediate layers of a relatively soft rubber composition and a middle layer of a relatively hard rubber composition.

2. A laminated composition for resisting the transmission of vibration comprising outer sheets of densely compacted rubber coated fibres, alternate sheets of a relatively soft rubber composition and hard rubber disposed between the outer sheets, all adhesively secured together in a relatively rigid whole capable of yielding slightly under compression.

HARRY F. ECKHARDT.